United States Patent
LeBlanc et al.

(10) Patent No.: US 6,900,568 B2
(45) Date of Patent: May 31, 2005

(54) FLUID DYNAMIC BEARING MOTOR CONFIGURED WITH AN INTEGRATED COUNTERPLATE TO CONTAIN BEARING FLUID

(75) Inventors: Jeffry Arnold LeBlanc, Aptos, CA (US); Norbert Steven Parsoneault, Scotts Valley, CA (US); Robert Alan Nottingham, Santa Cruz, CA (US); Troy Michael Herndon, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 17 days.

(21) Appl. No.: 10/725,700

(22) Filed: Dec. 1, 2003

(65) Prior Publication Data

US 2004/0207277 A1 Oct. 21, 2004

Related U.S. Application Data

(60) Provisional application No. 60/463,675, filed on Apr. 16, 2003.

(51) Int. Cl.⁷ .................................................. H02K 7/08
(52) U.S. Cl. ......................... 310/90; 384/100; 384/119
(58) Field of Search ................................. 310/90, 67 R; 384/100, 107, 119

(56) References Cited

U.S. PATENT DOCUMENTS

| | | | | |
|---|---|---|---|---|
| 4,254,961 A | * | 3/1981 | Fersht et al. | 277/410 |
| 5,246,294 A | * | 9/1993 | Pan | 384/119 |
| 5,403,098 A | * | 4/1995 | Yasui et al. | 384/115 |
| 5,558,443 A | * | 9/1996 | Zang | 384/112 |
| 5,558,445 A | * | 9/1996 | Chen et al. | 384/132 |
| 5,658,080 A | * | 8/1997 | Ichiyama | 384/112 |
| 6,219,199 B1 | | 4/2001 | Sakuragi et al. | |
| 6,246,136 B1 | * | 6/2001 | Ichiyama | 310/90 |
| 6,301,074 B2 | | 10/2001 | Sakuragi et al. | |
| 6,404,586 B2 | | 6/2002 | Sakuragi et al. | |
| 2003/0030222 A1 | | 2/2003 | Grantz et al. | |

OTHER PUBLICATIONS

U.S. Appl. No. 10/696,755, filed Oct. 29, 2003 entitled: Top Cover Attached Single Plate Fluid Dynamic Bearing Motor.

* cited by examiner

Primary Examiner—Dang Le
(74) Attorney, Agent, or Firm—Morrison & Foerster LLP

(57) ABSTRACT

A fluid dynamic bearing motor assembly is described. In one embodiment, the assembly includes a shaft, a sleeve configured to rotate about a rotational axis, and a counterplate attached to the sleeve. The counterplate includes a radial section and a axial section, which is attached to the radial section and partially defines a labyrinth to remove bearing fluid from a region between the shaft and the axial section.

15 Claims, 3 Drawing Sheets

FLUID DYNAMIC BEARING MOTOR CONFIGURED WITH AN INTEGRATED COUNTERPLATE TO CONTAIN BEARING FLUID

CROSS-REFERENCE TO RELATED APPLICATION

This application relates to, and claims the priority benefit of, U.S. Provisional Patent Application No. 60/463,675, titled "Integral Seal and Counter-Plate for FDB Motor," filed on Apr. 16, 2003. The subject matter of the related application is hereby incorporated by reference.

BACKGROUND OF THE INVENTION

1. Field of the Invention

This invention relates generally to fluid dynamic bearings and more specifically to a fluid dynamic bearing motor assembly configured with an integrated counterplate to contain bearing fluid within the assembly.

2. Description of the Background Art

FIG. 1 is an exploded perspective view illustrating a prior art disc drive 100. As shown, disc drive 100 may include, without limitation, a housing 105, a shaft 130, discs 135 and a suspension arm assembly 150. Housing 105 includes a base 110 that is attached to a cover 115. In addition, a seal 120 may be disposed in between base 110 and cover 115. One or more discs 135, which have surfaces 140 covered with a media configured to store information, are attached to shaft 130. During operation, suspension arm assembly 150 is configured to suspend read/write heads 145 above surfaces 140 as a spindle motor (not shown) rotates discs 135 about shaft 130 at high speed. Suspension arm assembly 150 is further configured to move read/write heads 145 radially across surfaces 140 to position read/write heads 145 above different radially spaced tracks (not shown) disposed on surfaces 140 where encoded information may be stored within the media. Once positioned, read/write heads 145 may either read encoded information from or write encoded information to the media at selected locations.

FIG. 2 is a cross-sectional view illustrating a fluid dynamic bearing motor assembly 200. Fluid dynamic bearing motors, such as fluid dynamic bearing motor assembly (hereinafter "FDB motor assembly") 200, oftentimes are used in precision-oriented electronic devices to achieve better performance. For example, using a fluid dynamic bearing motor in a disc drive, such as disc drive 100 described above in conjunction with FIG. 1, results in more precise alignment between the tracks of the discs and the read/write heads. More precise alignment, in turn, allows discs to be designed with greater track densities, thereby decreasing the size of the discs and/or increasing the storage capacity of the discs.

As shown, FDB motor assembly 200 includes, without limitation, a shaft 202, a sleeve 206, a counterplate 208, a thrust plate 210, fluid dynamic thrust bearings 212 and 214, a capillary seal 216 and a protective shield 222. Shaft 202 is attached to a top cover 209 of a disc drive housing and is configured to remain stationary. Thrust plate 210 is attached to shaft 202 and therefore also remains stationary. Thrust plate 210 is configured to provide thrust surfaces for fluid dynamic thrust bearings 212 and 214 and a seal wall 220 for capillary seal 216. Sleeve 206 is configured to rotate about a rotational axis 204 and to provide a thrust surface for fluid dynamic thrust bearing 214. Counterplate 208 is attached to sleeve 206 and therefore rotates about rotational axis 204 as well. Counterplate 208 is configured to provide a thrust surface for fluid dynamic thrust bearing 212 and a seal wall 218 for capillary seal 216. Bearing fluid fills gaps 213 and 215 between surfaces of thrust plate 210 and facing surfaces of counter plate 208 and sleeve 206. As is well known to persons skilled in the art, appropriate pumping grooves (not shown) are provided along one or more thrust surfaces of each of fluid dynamic thrust bearings 212 and 214 to create localized regions of high pressure to support the axial load generated by the rotating elements of FDB motor assembly 200.

Attaching shaft 202 to top cover 209 provides shaft 202 with additional stiffness, which decreases vibration and non-repetitive run-out, thereby improving the performance of FDB motor assembly 200. As persons skilled in the art will recognize, one consequence of such a configuration is that an additional opening 221 into the bearing fluid is created. To prevent bearing fluid from escaping from FDB motor assembly 200 during normal operation and when FDB motor assembly 200 is subjected to shocks, various elements, may be added to FDB motor assembly 200. One such approach, set forth in the embodiment of FIG. 2, includes adding elements such as capillary seal 216 and protective shield 222 to FDB motor assembly 200.

Capillary seal 216 acts to maintain the bearing fluid within a bearing fluid reservoir 217. Protective shield 222 is coupled to counter plate 208 and has a distal end 226 disposed in close proximity to shaft 202. Among other things, protective shield 222 acts as a splash guard to prevent bearing fluid that splashes out of fluid reservoir 217 upon a shock from escaping from FDB motor assembly 200.

In addition, an exclusion seal (not shown) may be added at a location 224 to prevent bearing fluid that splashes out of bearing fluid reservoir 217 upon a shock from escaping from FDB motor assembly 200 through the gap between distal end 226 of protective shield 222 and shaft 202. Typically, an exclusion seal is an additional element added between distal end 226 and shaft 202. In some instances, however, protective shield 222 may be configured to provide an exclusion seal by bending distal end 226 such that a capillary seal may be formed between protective shield 222 and shaft 202.

As the foregoing illustrates, an approach to containing the bearing fluid within FDB motor assembly 200 that includes adding fewer elements to FDB motor assembly 200 is desirable because adding fewer elements simplifies the design and assembly of FDB motor assembly 200.

SUMMARY OF THE INVENTION

One embodiment of a fluid dynamic bearing motor assembly includes a shaft, a sleeve configured to rotate about a rotational axis, and a counterplate attached to the sleeve. The counterplate includes a radial section and an axial section, which is attached to the radial section and partially defines a labyrinth to remove bearing fluid from a region between the shaft and the axial section.

One advantage of the fluid dynamic bearing motor assembly described above is that the counterplate is configured to provide the additional functionality of both an exclusionary seal and a protective shield. Further, the counterplate and the thrust plate also may be configured to form a capillary seal to maintain bearing fluid within a bearing fluid reservoir. Using fewer parts to contain bearing fluid within the fluid dynamic bearing motor assembly substantially decreases the cost and complexity of the design and assembly of the motor assembly.

DETAILED DESCRIPTION OF THE INVENTION

Figure 1:
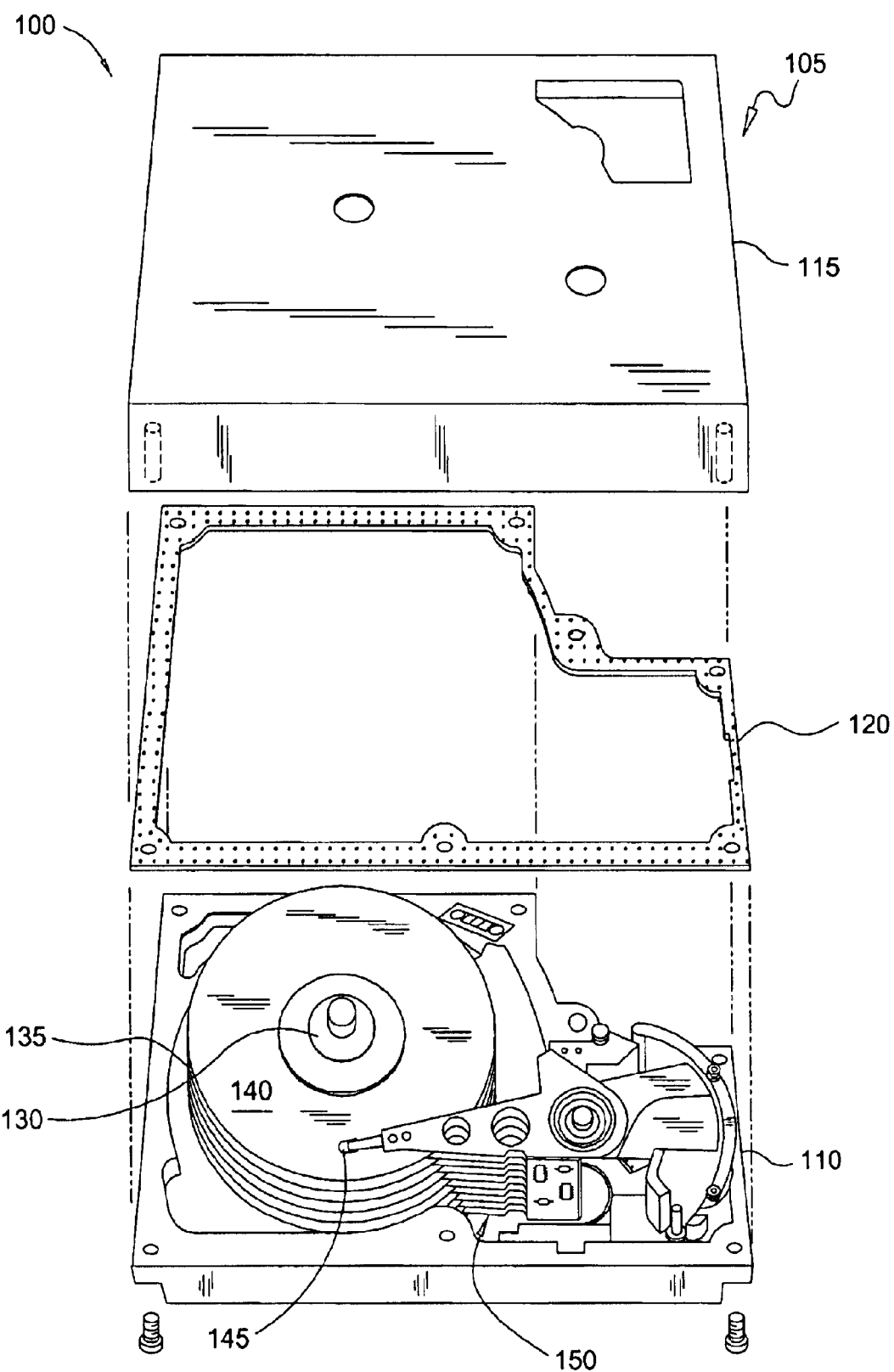
FIG. 1 is an exploded perspective view illustrating a prior art disc drive.
Figure 2:
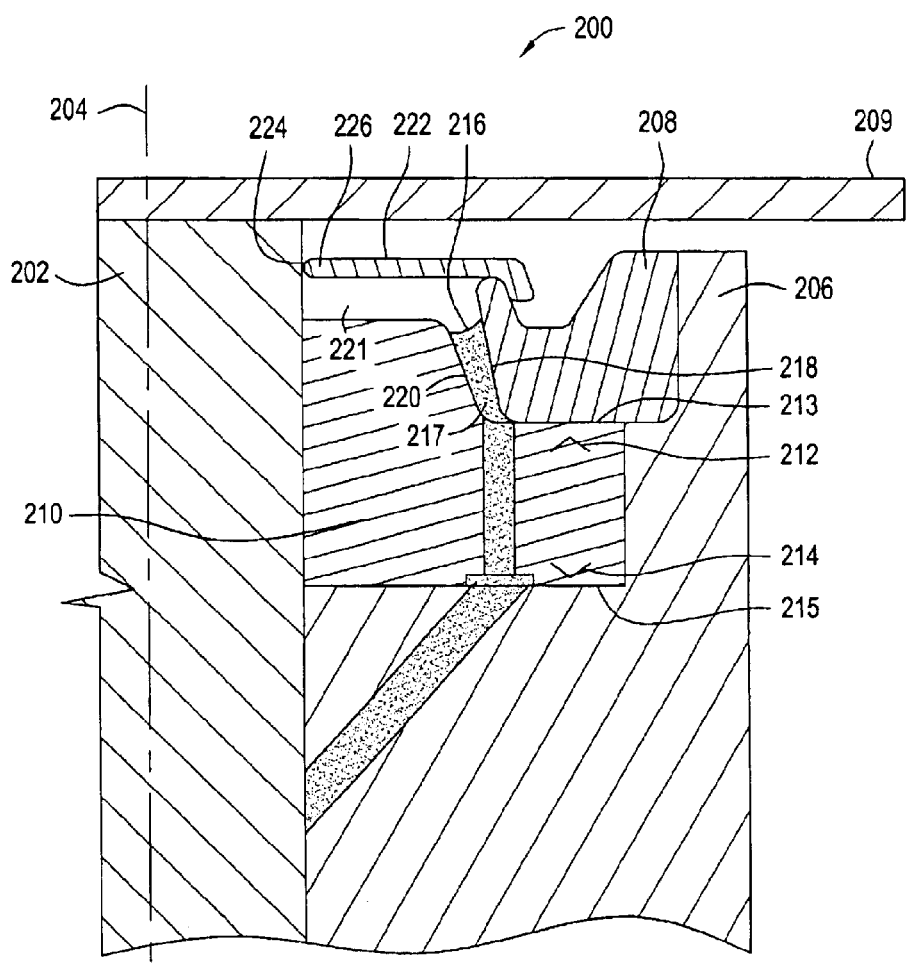
FIG. 2 is a cross-sectional view illustrating a fluid dynamic bearing motor assembly.
Figure 3:
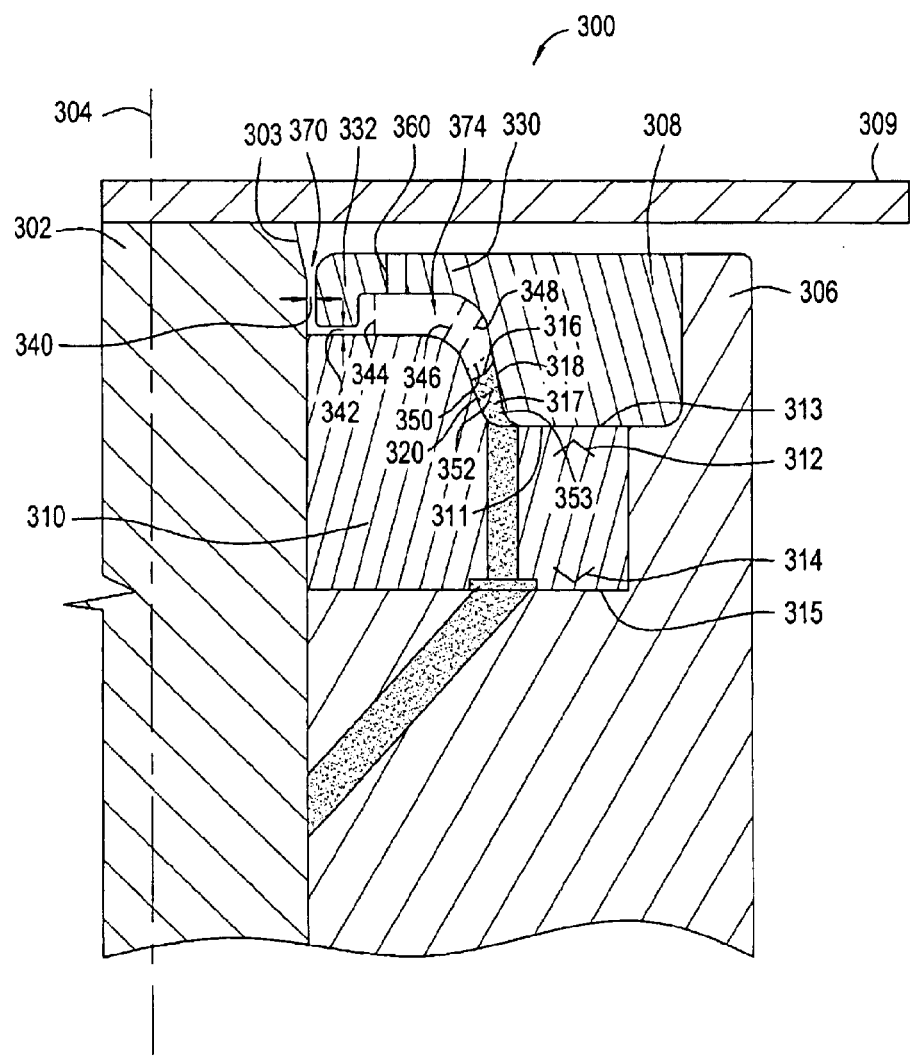
FIG. 3 is a cross-sectional view illustrating a fluid dynamic bearing motor assembly, according to one embodiment of the invention.

FIG. 3 is a cross-sectional view illustrating a fluid dynamic bearing motor assembly 300, according to one embodiment of the invention. As shown, FDB motor assembly 300 includes, without limitation, a shaft 302, a sleeve 306, a counterplate 308, a thrust plate 310, fluid dynamic thrust bearings 312 and 314, and a capillary seal 316.

Shaft 302 is attached to a top cover 309 of a disc drive housing and is configured to remain stationary. Thrust plate 310 is attached to shaft 302 and therefore also remains stationary. Among other things, thrust plate 310 provides thrust surfaces for fluid dynamic thrust bearings 312 and 314. Sleeve 306 is configured to rotate about a rotational axis 304 and to provide a thrust surface for fluid dynamic thrust bearing 314. Counterplate 308 is attached to sleeve 306 and therefore also rotates about rotational axis 304. Counterplate 308 further provides a thrust surface 311 for fluid dynamic thrust bearing 312. Bearing fluid fills gaps 313 and 315 between surfaces of thrust plate 310 and facing surfaces of counter plate 308 and sleeve 306. The bearing fluid may be any type of suitable liquid such as, for example, oil or a ferromagnetic fluid. Again, as is well known to persons skilled in the art, appropriate pumping grooves (not shown) are provided along one or more thrust surfaces of each of fluid dynamic thrust bearings 312 and 314 to create localized regions of high pressure to support the axial load generated by the rotating elements of FDB motor assembly 300.

As FIG. 3 also shows, counterplate 308 is configured to prevent bearing fluid from escaping from FDB motor assembly 300 (because of a shock or otherwise) in at least the following ways. First, counterplate 308 includes an axial section 332, which is disposed at the inner diameter of the counterplate 308 and partially defines a labyrinth configured to remove bearing fluid from a region 370, which is disposed between shaft 302 and axial section 332. More specifically, under certain conditions, bearing fluid may splash out of a bearing fluid reservoir 317 into region 370. Shaft 302 and axial section 332 are configured such that a gap 340 between shaft 302 and the inner surface of axial section 332 is larger than a gap 342 between the bottom surface of axial section 332 and the facing surface of thrust plate 310. Shaft 302 also is configured with a tapered wall 303. When bearing fluid splashes out of bearing fluid reservoir 317 into region 370, capillary action created by tapered wall 303 draws the bearing fluid towards gap 342. Further, as persons skilled in the art will understand, the size difference between gaps 340 and 342 creates additional capillary action that draws the bearing fluid through gap 342 into a cavity 374 between counterplate 308 and thrust plate 310. In this fashion, gaps 340 and 342 create a labyrinth that removes bearing fluid from region 370. In addition, centrifugal forces generated by the relative rotation of counterplate 308 and thrust plate 310 about rotational axis 304 during operation cause bearing fluid in gap 342 to move into cavity 374. As persons skilled in the art will recognize, the interactions between axial section 332 and shaft 302 and thrust plate 310 described herein provide functionality similar to that of an exclusion seal.

Second, counterplate 308 includes a radial section 330 that acts in conjunction with axial section 332 as a splash guard. As configured, radial section 330 and axial section 332 attempt to block bearing fluid that splashes out of bearing fluid reservoir 317 and contain that bearing fluid within cavity 374, thereby limiting the amount of bearing fluid that escapes into region 370. In addition to acting as a splash guard, radial section 330 and axial section 332 also prevent air, particles and other impurities from entering cavity 374 during operation or assembly and contaminating the bearing fluid. Radial section 330 is further configured with a fill hole 360, which is used to add bearing fluid to FDB motor assembly 300. Fill hole 360 may be configured such that the amount of bearing fluid that escapes FDB motor assembly 300 through fill hole 360, if any, is not appreciable. As persons skilled in the art will recognize, radial section 330 and axial section 332 provide functionality similar to that of a protective shield and an exclusion seal.

Third, cavity 374 is configured with decreasing widths from axial section 332 to a distal end 353 of bearing fluid reservoir 317 to generate capillary action that draws bearing fluid from cavity 374 into bearing fluid reservoir 317. For example, a gap 344, which is disposed in close proximity to axial section 332, is larger than a gap 346, which is disposed closer to bearing fluid reservoir 317. Similarly, gap 346 is larger than a gap 348, which is disposed even closer to bearing fluid reservoir 317. Gap 348, in turn, is larger than a gap 350, which is disposed in close proximity to the mouth of bearing fluid reservoir 317. Likewise, gap 350 is larger than a gap 352, which is disposed in proximity to distal end 353 of bearing fluid reservoir 317. As persons skilled in the art will recognize, under static conditions, such a configuration creates a capillary effect that moves bearing fluid that either has splashed out of bearing fluid reservoir 317 into cavity 374 or has been drawn into cavity 374 from region 370 towards bearing fluid reservoir 317. Further, under dynamic conditions, centrifugal forces generated by the relative rotation of counterplate 308 and thrust plate 310 about rotational axis 304 also cause bearing fluid in cavity 374 to move towards bearing fluid reservoir 317.

Finally, counterplate 308 and thrust plate 310 provide appropriately tapered seal walls 318 and 320, respectively, such that capillary seal 316 may be formed between counterplate 308 and thrust plate 310 as depicted. Capillary seal 316 acts to contain the bearing fluid within bearing fluid reservoir 317.

One advantage of FDB motor assembly 300 described above is that counterplate 308 is configured to provide the functionality of both an exclusionary seal and a protective shield. Further, counterplate 308 and thrust plate 310 also may be configured to form capillary seal 316 to contain the bearing within bearing fluid reservoir 317. Using fewer parts to contain bearing fluid within FDB motor assembly 300 substantially decreases the cost and complexity of the design and assembly of FDB motor assembly 300. Another advantage is that the large number of small gaps disposed between bearing fluid reservoir 317 and the external environment, such as gaps 340, 342 and 346, resulting from the configuration of counterplate 308, reduces bearing fluid evaporation.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A fluid dynamic bearing motor assembly, the assembly comprising:
   a shaft;
   a sleeve configured to rotate about a rotational axis; and
   a counterplate attached to the sleeve, the counterplate including a radial section and an axial section, the axial section being attached to the radial section and partially defining a labyrinth to remove bearing fluid from a region defined between the shaft and the axial section.

2. The assembly of claim 1, wherein the shaft includes a tapered wall configured such that capillary action draws bearing fluid from the region defined between the shaft and the axial section through a first gap defined between the shaft and the axial section.

3. The assembly of claim 1, further comprising a first gap defined between the shaft and the axial section and a second gap defined between the axial section and a thrust plate, the thrust plate being attached to the shaft, and the first gap being larger than the second gap such that capillary action draws bearing fluid from the region defined between the shaft and the axial section through the first gap towards the second gap.

4. The assembly of claim 3, wherein the labyrinth comprises the first gap and the second gap.

5. The assembly of claim 3, wherein centrifugal forces generated by the relative rotation of the thrust plate and the counterplate move bearing fluid through the second gap towards a cavity defined between the counterplate and the thrust plate.

6. The assembly of claim 1, wherein the radial section and the axial section are configured to prevent bearing fluid from splashing out of a bearing fluid reservoir into the region defined between the shaft and the axial section.

7. The assembly of claim 6, wherein the bearing fluid reservoir is defined by diverging surfaces of the counterplate and a thrust plate, the thrust plate being attached to the shaft.

8. The assembly of claim 7, wherein the radial section and the axial section are configured to contain the bearing fluid that splashes out of the bearing fluid reservoir within a cavity defined between the counterplate and the thrust plate.

9. The assembly of claim 1, further comprising a cavity defined between the counterplate and a thrust plate, the thrust plate being attached to the shaft, and the cavity being configured with decreasing widths between the axial section and a distal end of a bearing fluid reservoir such that capillary action draws bearing fluid disposed within the cavity towards the bearing fluid reservoir.

10. The assembly of claim 9, wherein the bearing fluid reservoir is defined by diverging surfaces of the counterplate and the thrust plate.

11. The assembly of claim 9, wherein centrifugal forces generated by the relative rotation of the thrust plate and the counterplate move bearing fluid disposed within the cavity towards the bearing fluid reservoir.

12. The assembly of claim 1, wherein a thrust plate includes a first seal wall and the counterplate includes a second seal wall, the thrust plate being attached to the shaft, and the first seal wall and second seal wall being configured to form a capillary seal that contains bearing fluid within a bearing fluid reservoir.

13. The assembly of claim 1, wherein the counterplate provides a thrust surface for a fluid dynamic thrust bearing.

14. The assembly of claim 1, wherein the assembly is disposed within an electronic device.

15. The assembly of claim 14, wherein the electronic device is a disc drive.

* * * * *